US011607700B1

(12) United States Patent
Kuchinski et al.

(10) Patent No.: US 11,607,700 B1
(45) Date of Patent: Mar. 21, 2023

(54) METHOD AND APPARATUS FOR COATING OBJECTS WITH MINIMAL COATING DAMAGE

(71) Applicant: Madeline A. Kuchinski, Lancaster, PA (US)

(72) Inventors: Madeline A. Kuchinski, Lancaster, PA (US); Frank A. Kuchinski, Lancaster, PA (US); Stephen T. Opresko, Lancaster, PA (US); Cullen L. Hackler, Alpharetta, GA (US)

(73) Assignee: Madeline A. Kuchinski, Lancaster, PA (US)

( * ) Notice: Subject to any disclaimer, the term of this patent is extended or adjusted under 35 U.S.C. 154(b) by 1224 days.

(21) Appl. No.: 15/587,800

(22) Filed: May 5, 2017

Related U.S. Application Data

(60) Provisional application No. 62/332,920, filed on May 6, 2016.

(51) Int. Cl.
 *B05B 13/02* (2006.01)
 *B05C 13/00* (2006.01)
(52) U.S. Cl.
 CPC .......... *B05B 13/0221* (2013.01); *B05C 13/00* (2013.01)
(58) Field of Classification Search
 CPC ... B05B 13/0221; B25J 15/0441; B25J 15/06; B25J 15/0608; B65H 2301/44332
 See application file for complete search history.

(56) References Cited

U.S. PATENT DOCUMENTS

| | | | |
|---|---|---|---|
| 2,873,843 A | 2/1959 | Wilson et al. |
| 3,057,325 A | 10/1962 | Nance |
| 2,398,517 A | 4/1964 | Castor et al. |
| 3,140,195 A | 7/1964 | Nagel et al. |
| 3,513,012 A | 5/1970 | Point et al. |
| 3,581,873 A | 6/1971 | Spodig et al. |
| 3,826,226 A | 7/1974 | Clark |
| 4,188,415 A | 2/1980 | Takahashi et al. |
| 4,242,982 A | 1/1981 | Drake et al. |
| 4,548,837 A | 10/1985 | Yoshino et al. |
| 5,173,326 A | 12/1992 | Kramer |
| 7,857,297 B2 | 12/2010 | Ong |
| 8,182,608 B2 | 5/2012 | Kerr et al. |
| 8,397,664 B2 | 3/2013 | Lin et al. |
| 2003/0113475 A1 | 6/2003 | Kitahata et al. |

(Continued)

FOREIGN PATENT DOCUMENTS

| | | | |
|---|---|---|---|
| AU | 2012200526 A1 | 8/2012 |
| GB | 304812 A | 1/1929 |

(Continued)

*Primary Examiner* — Joel D Crandall
(74) *Attorney, Agent, or Firm* — Dickinson Wright PLLC; Andrew D. Dorisio

(57) ABSTRACT

An apparatus for transporting a component at least partially coated with a flowable coating material is provided. The apparatus includes a holder adapted for selectively forming a releasable coupling with the component. The holder including a screen for minimizing contact with the component during the transfer. The screen thus serves as a spacer for creating multiple areas of contact with the component, yet the contact is achieved in a manner such that damage to the coating is minimized. Related methods are also disclosed.

11 Claims, 9 Drawing Sheets

(56) References Cited

U.S. PATENT DOCUMENTS

| | | | |
|---|---|---|---|
| 2003/0211813 A1* | 11/2003 | Kassir | B23B 31/307 451/28 |
| 2010/0071192 A1* | 3/2010 | Sarh | B21J 15/14 29/525.06 |
| 2016/0284457 A1* | 9/2016 | Wilson | H01F 7/20 |

FOREIGN PATENT DOCUMENTS

| | | |
|---|---|---|
| GB | 1240152 A | 7/1971 |
| JP | 61277303 | 6/1997 |

* cited by examiner

METHOD AND APPARATUS FOR COATING OBJECTS WITH MINIMAL COATING DAMAGE

This application claims the benefit of U.S. Provisional Patent Application Ser. No. 62/332,920, the disclosure of which is incorporated herein by reference.

This invention was made with government support under Contract No. W912HZ15P0009 awarded by US Army Corps of Engineers (ERDC). The government has certain rights in the invention.

TECHNICAL FIELD

This application relates generally to the coating arts and, more particularly, to a method and apparatus for coating components with minimal coating damage.

BACKGROUND

Coating objects (metallic, non-metallic or otherwise) with a wet slurry or a mixture of materials is well known within the literature and manufacturing processes used throughout all industries. In fact, dipping, spraying, painting, flame coating, and other forms are currently in use in numerous industries in operation today.

Consider as an example components coated with a porcelain slurry for use in fabricating white goods, such as stoves, refrigerators, washers, dryers, etc. These components are handled/transferred during the coating and subsequent porcelain firing processes. In this process as well as in many others, the components being transferred during processing are large, and easy to handle with minimal contact during transfer from one process step to the next. Assorted hooks, hangers, and supports are used to hold the components, and any damage at the contact point is either minimal or in an inconspicuous location that will not impact product performance or degrade its appearance during use.

In some manufacturing processes, electromagnets are also used for component transfer. An issue arises with the area of contact between the electromagnet and the components being transferred during processing. Specifically, the size and location of the area of contact during transfer affects the coating characteristics of the components being processed. This area of contact may damage the coating and the component which leads to poor coating characteristics. Component rework, and in some cases total rejection, of the coated component occurs.

As the components being transferred during processing get physically smaller, the negative impact of contact on the component significantly increases. This contact causes surface damage/poor coating characteristics to a higher percentage of the components, to a higher proportion of the coated surface area of each component, or both. In fact coating characteristics of small components being transferred often require multiple coating steps to insure good coating.

Accordingly, a need is identified for an improved apparatus and methods for coating components with minimal damage to the coating resulting from contact with said component.

SUMMARY

The purpose of this disclosure is to describe an apparatus and method that results in improved coating characteristics of objects or components, particularly those with a wet slurry or a mixture of materials, by reducing damage caused by a holder, carrier, or other form of transfer device. The technique described in this invention is applicable to the processes used for transporting and processing components of various physical sizes, shapes and weights.

According to one aspect of the disclosure, an apparatus for transporting a component at least partially coated with a flowable coating is provided. The apparatus comprises a holder adapted for selectively forming a releasable coupling with the component. The holder includes a screen (spacer) for minimizing contact with a portion of the component including the flowable coating during the transfer (which may be achieved using a lifter). The screen may comprise a hydrophobic material.

In one embodiment, the holder comprises an electromagnet for selectively forming a magnetic coupling with the component. The screen may comprise an open mesh formed of one or more non-flat members. In particular, the screen may include at least one opening having a dimension that is less than a corresponding dimension of the component being coated when releasably coupled to the holder. The at least one opening may be generally square or rectangular, but could take other shapes or combinations of shapes.

Optionally, the apparatus may further include a shield between the holder and the screen. The shield serves to eliminate contact to the holder from the at least partially coated component during the transfer. In one embodiment, the shield comprises a sheet of material covering a portion of the electromagnet between the holder and the screen.

A further aspect of the disclosure pertains to an apparatus for transporting a component coated with a flowable coating. The apparatus includes a holder with an electromagnet for coupling with the component. A portion of the holder adjacent to the electromagnet includes a spacer for forming multiple areas of contact with a portion of the component including the flowable coating during the transfer. In one embodiment, the spacer comprises a plurality of elongated members, which may form an open mesh for positioning along a portion of the electromagnet opposite the component. A shield may optionally be provided for shielding the electromagnet from the at least partially coated component.

Still a further aspect of the disclosure relates to a method for at least partially coating a component. The method comprises at least partially coating the component with a flowable coating. The method further comprises coupling the at least partially coated component with a holder including a spacer (screen) adapted for creating multiple areas of contact with the at least partially coated component.

The coupling step may comprise forming the coupling with the at least partially coated component located in a first bed including the flowable coating. The method may further include the steps of decoupling the component from the holder and delivering the at least partially coated component to a second bed for coating the component with the flowable coating or a different coating. The coupling step may further comprise forming a magnetic coupling between the holder and the component.

The method may still further include the step of using the holder to deliver the component to the flowable coating. The coupling step may also comprise lowering the holder to couple with the component and raising the component. A component coating using the disclosed method is also described.

In the following description, there are shown and described several embodiments of an apparatus and method for coating components and, in particular, small components, with minimal coating damage. As it should be realized, the apparatus and method are capable of other, different embodiments and their several details are capable of modification in various, obvious aspects all without departing from the inventions as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the invention, and together with the description serve to explain certain principles thereof. In the drawing figures.

Figure 4:
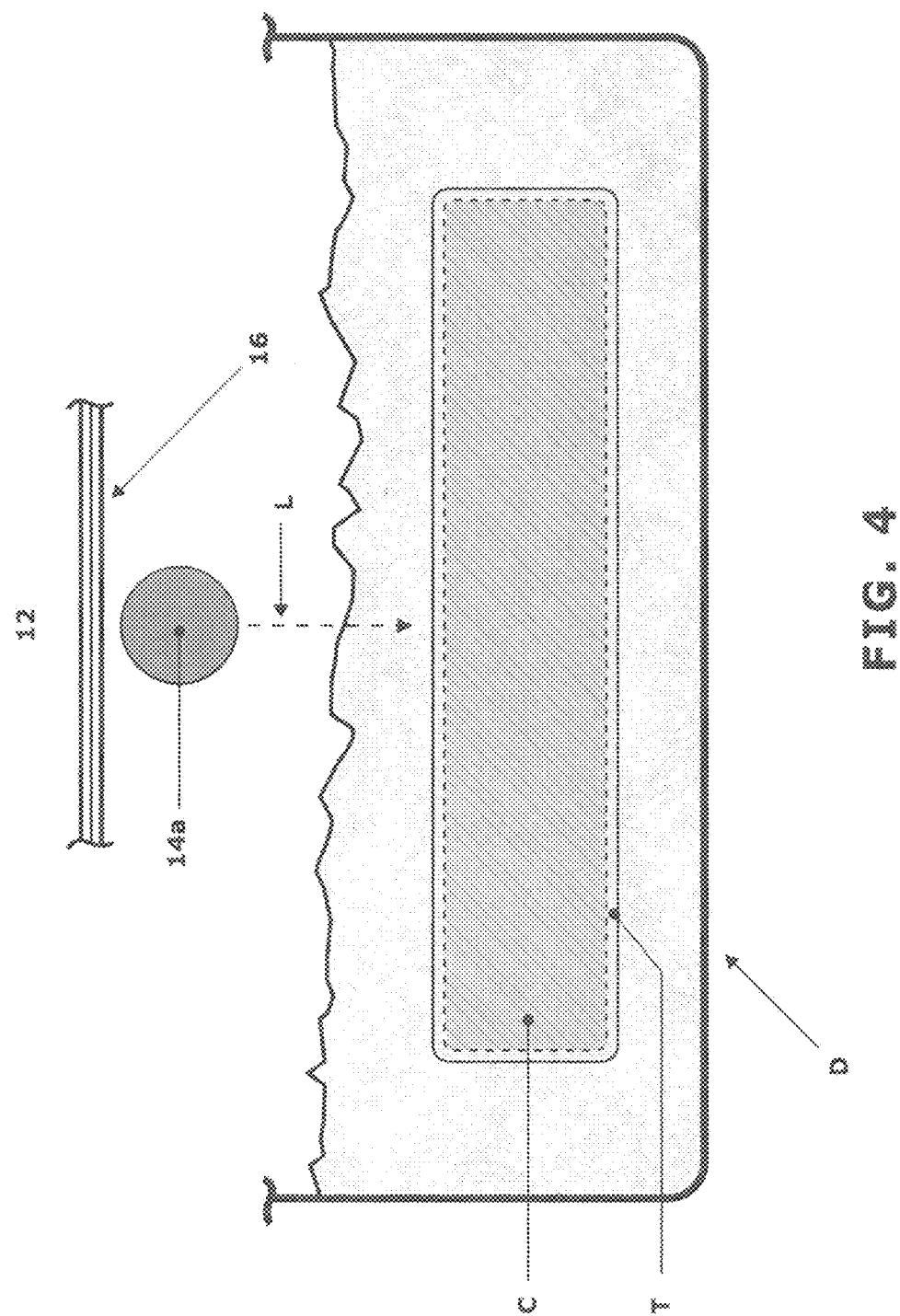
Figure 5:
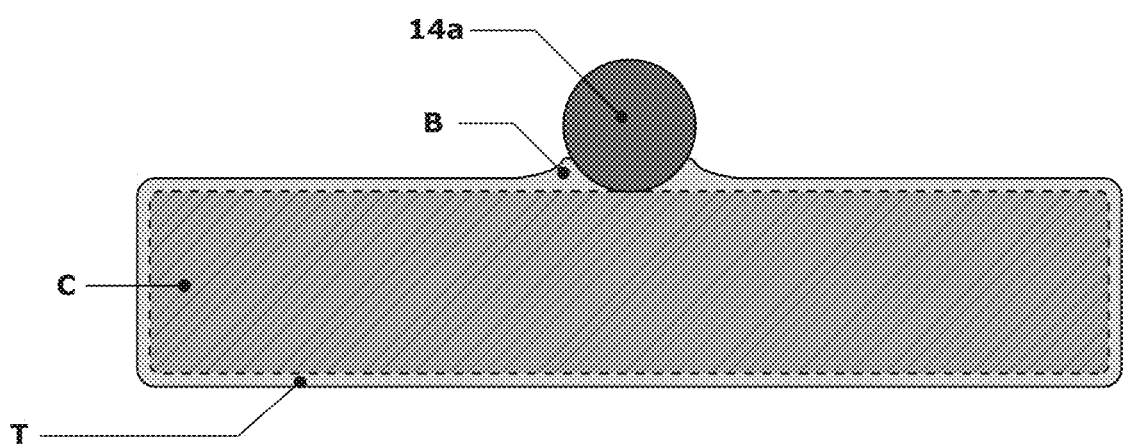
Figure 6:
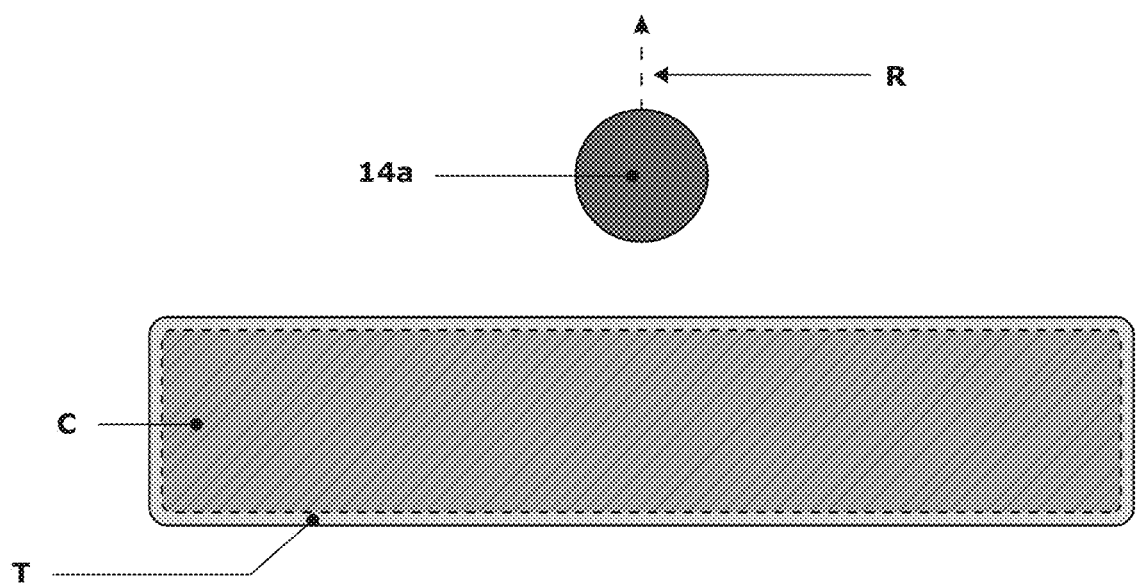
Figure 7:
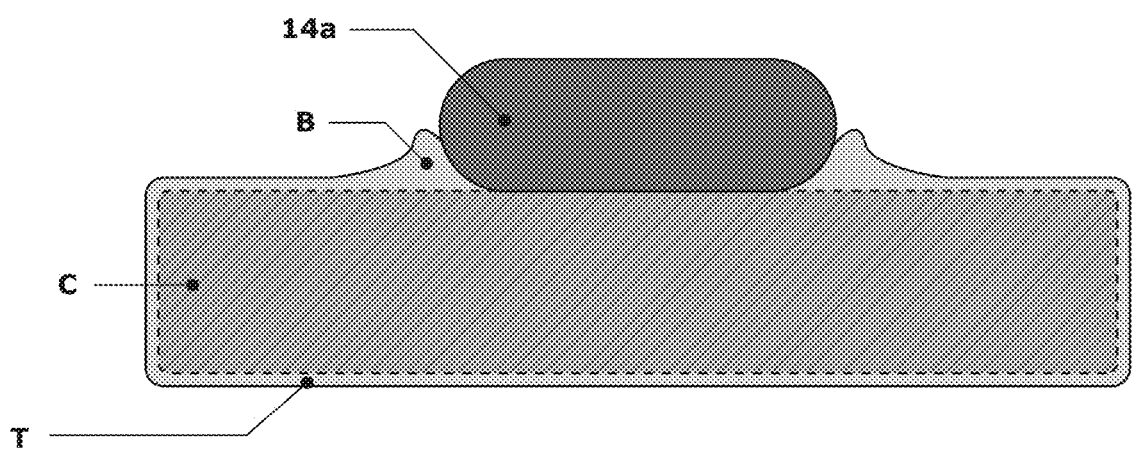
Figure 8:
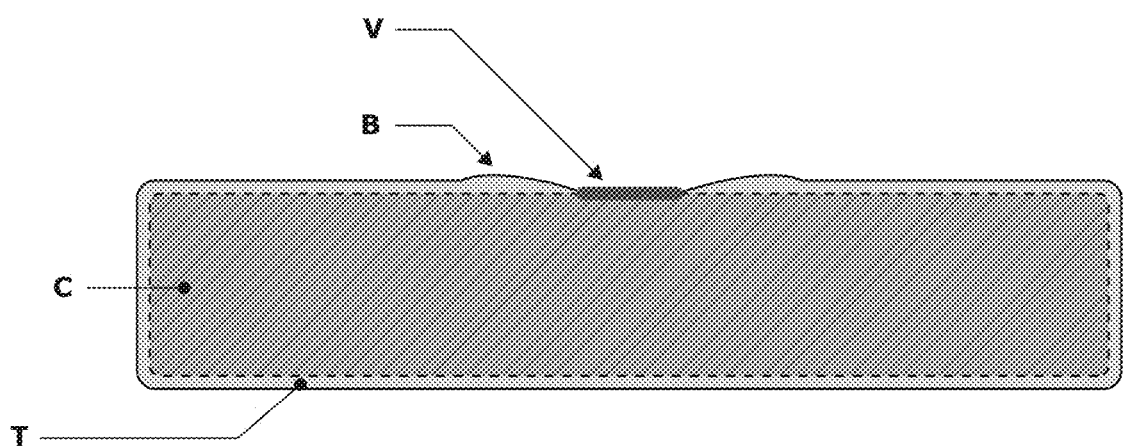
Figure 9:
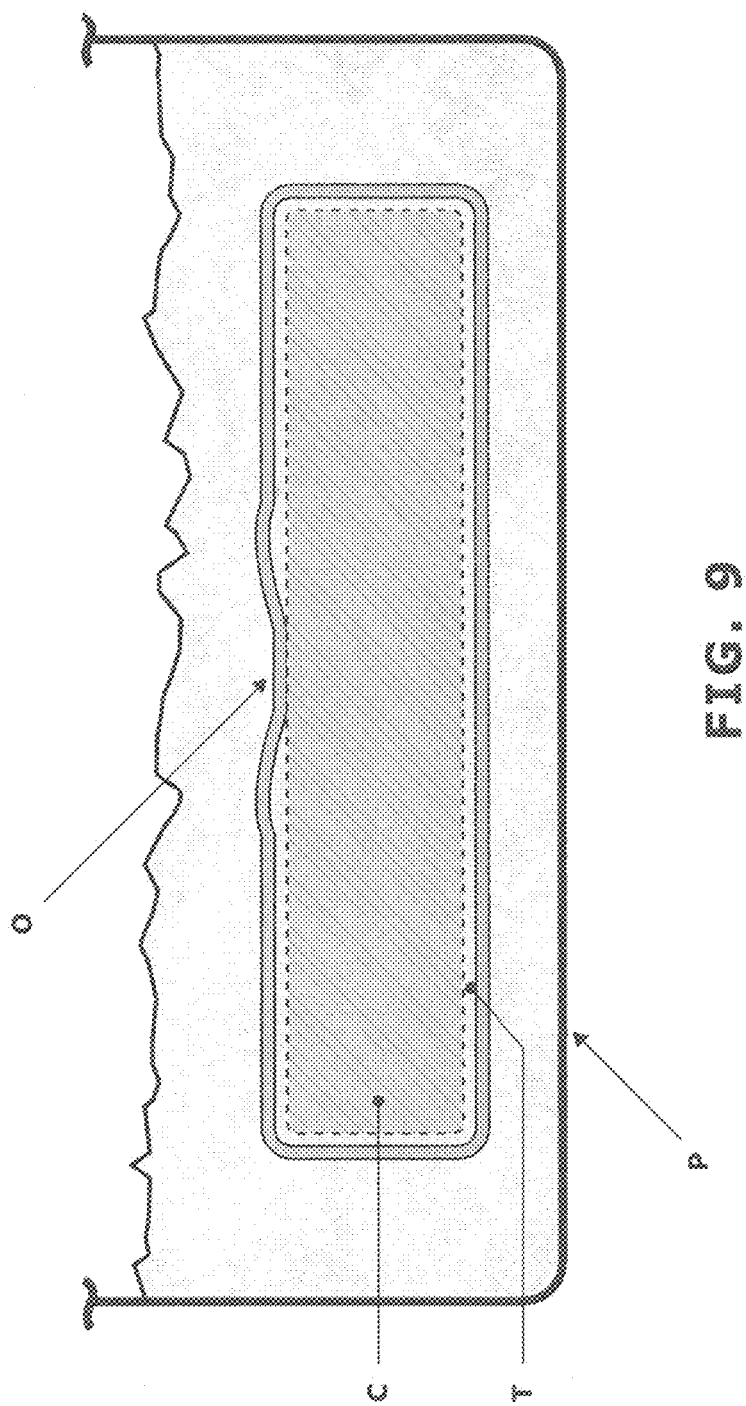

FIGS. 4, 5, and 6 illustrate use of the apparatus for coating a component according to one aspect of the disclosure; and FIGS. 7, 8, and 9 illustrate use of the apparatus for coating one or more components according to another aspect of the disclosure.

Reference will now be made in detail to embodiments of the apparatus and method, examples of which are illustrated in the accompanying drawing figures, wherein like numerals are used to represent like elements.

DETAILED DESCRIPTION

Figure 1:
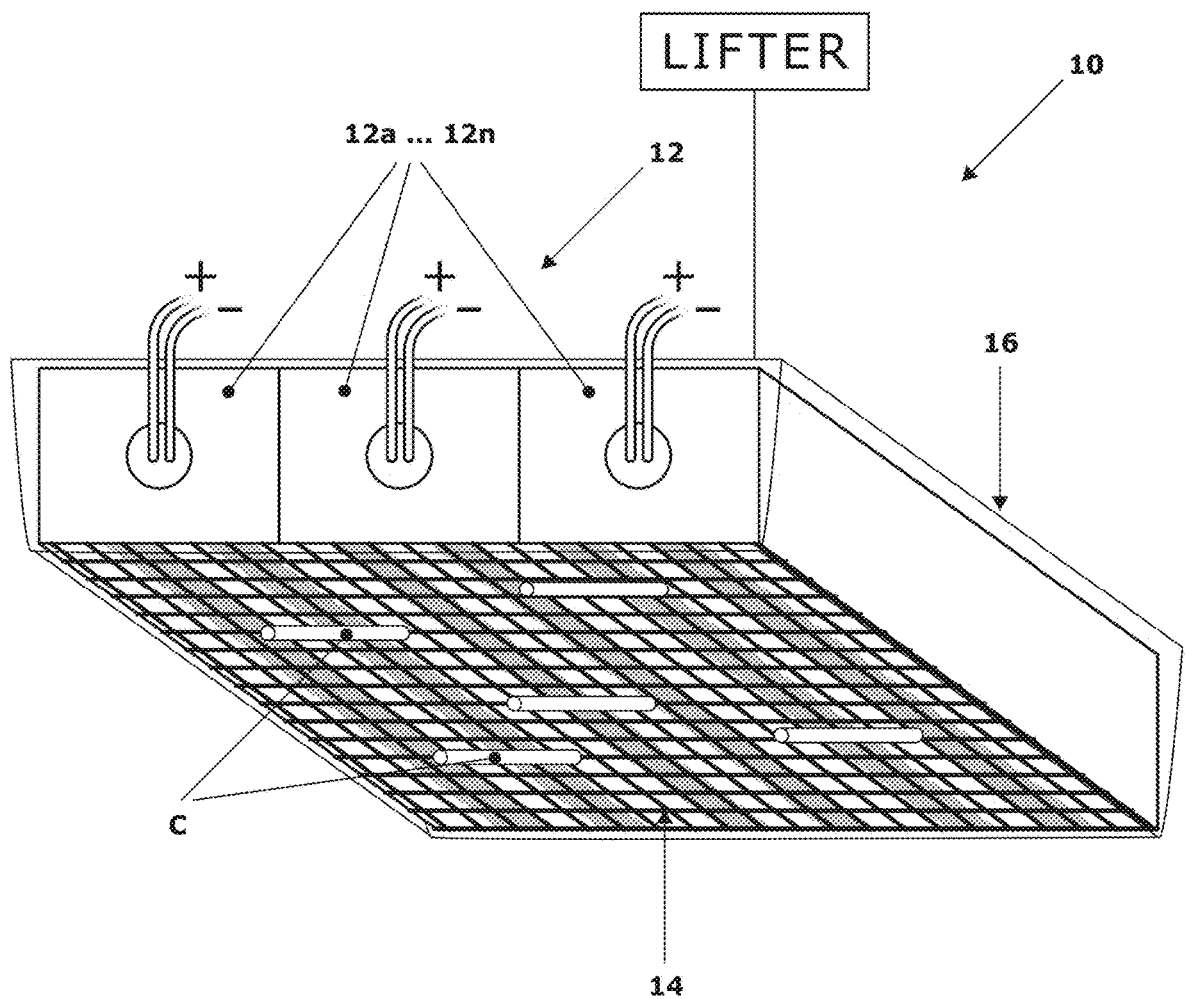
FIG. 1 is a perspective view of an apparatus for transporting one or more coated (or uncoated) components according to one aspect of the disclosure.

Referring now to FIG. 1, an apparatus for coating one or more objects is disclosed. In the illustrated embodiment, the apparatus comprises a holder 10 for temporarily holding one or more components C, such as in a suspended manner, as illustrated. The holder 10 may be associated with a motive device, such as for example a lifter, and thus may be moved vertically to raise or lower associated component(s) (which lifter may also be adapted possibly to convey the component from one location to another in a non-vertical direction. Thus, as outlined further in the description that follows, the holder 10 may be used to hold and move/transfer one or more components C (which as illustrated may be smooth-walled unitary objects that lack any fasteners or connectors for connecting with supports) between various processing steps (such as for example, between one or more coating steps).

To achieve this result, the holder 10 includes a device for forming a secure, but releasable coupling with the component for holding it in place. This may be achieved using an electromagnet 12 for coupling with the one or more of the components C, which are capable of being attracted by a magnet. The connection may be established along a lower portion or face of the electromagnet 12, but spaced therefrom for reasons that will be evident upon further review of the disclosure.

As illustrated, the electromagnet 12 may comprise a plurality of individually controlled electromagnet assemblies 12a . . . 12n (three illustrated). These individual electromagnet assemblies 12a . . . 12n may be positioned in tandem and connected together as a single unitary structure that can be moved about, such as in connection with the lifter. In any case, the electromagnet(s) 12 used may be coupled to a suitable power supply (not shown) for selective actuation for selectively coupling the holder 10 with the components C.

In accordance with one aspect of the disclosure, the holder 10 and, in particular, the electromagnet 12 forming a part thereof, may be associated with a spacer for minimizing the damage to any coating applied to the component(s) C being held as a result of the coupling when the electromagnet is activated. In the illustrated embodiment, this spacer comprises a screen 14 extending along a portion of the electromagnet(s) 12, such as along one side or face thereof. The screen 14 may be formed of at least two crossing members 14a, 14b, such as fibers, and preferably a plurality of such members so as to form an open mesh or reticulated structure. The members 14a, 14b are not flat, and thus may be circular in cross section (see, e.g., FIG. 4). Consequently, the area of contact between the screen 14 and the components C is minimal (see also FIG. 5).

To help prevent any coating material from adhering, this screen 14 may be constructed from or coated with a hydrophobic material. The hydrophobic material may comprise, for example, polyurethane, polytetrafluoroethylene, silicone, nylon, or the like. The cross section of the material forming the screen 14 may depend on the strength of the electromagnet 12, and the need for security in forming the coupling with the component(s) being transported.

The openings in the screen 14 may be sized so as to accommodate the coated portions of the components C to be transferred during processing. As shown in FIG. 1, the shape of the openings of the screen 14 can be generally square, but may be rectangular, round, elliptical, triangular or other geometries (including combinations of the foregoing) depending upon the physical characteristics of the component(s) C being processed. The openings in the screen 14 small enough to allow multiple areas of contact between the screen members and the component(s) being processed. The openings may be regular, as shown, or may be irregular, and may by applied along all or just a portion of the corresponding face of the holder 10.

In one example, an opening in the screen 14 that is less than 33% of the length the component C to be coated is desirable. For example, a rod shaped component C that is 1 inch long and 0.040 in diameter would suggest that an effective opening size is 0.20. The mesh openings may be sized sufficiently large to limit the coating surface tension from completely filling (closing) the mesh opening with coating. The cross section of the mesh material used to form the screen 14 may be kept at a minimum (less than 50% of the mesh opening) thereby keeping the exposed area of contact on component C relatively small.

Figure 2:
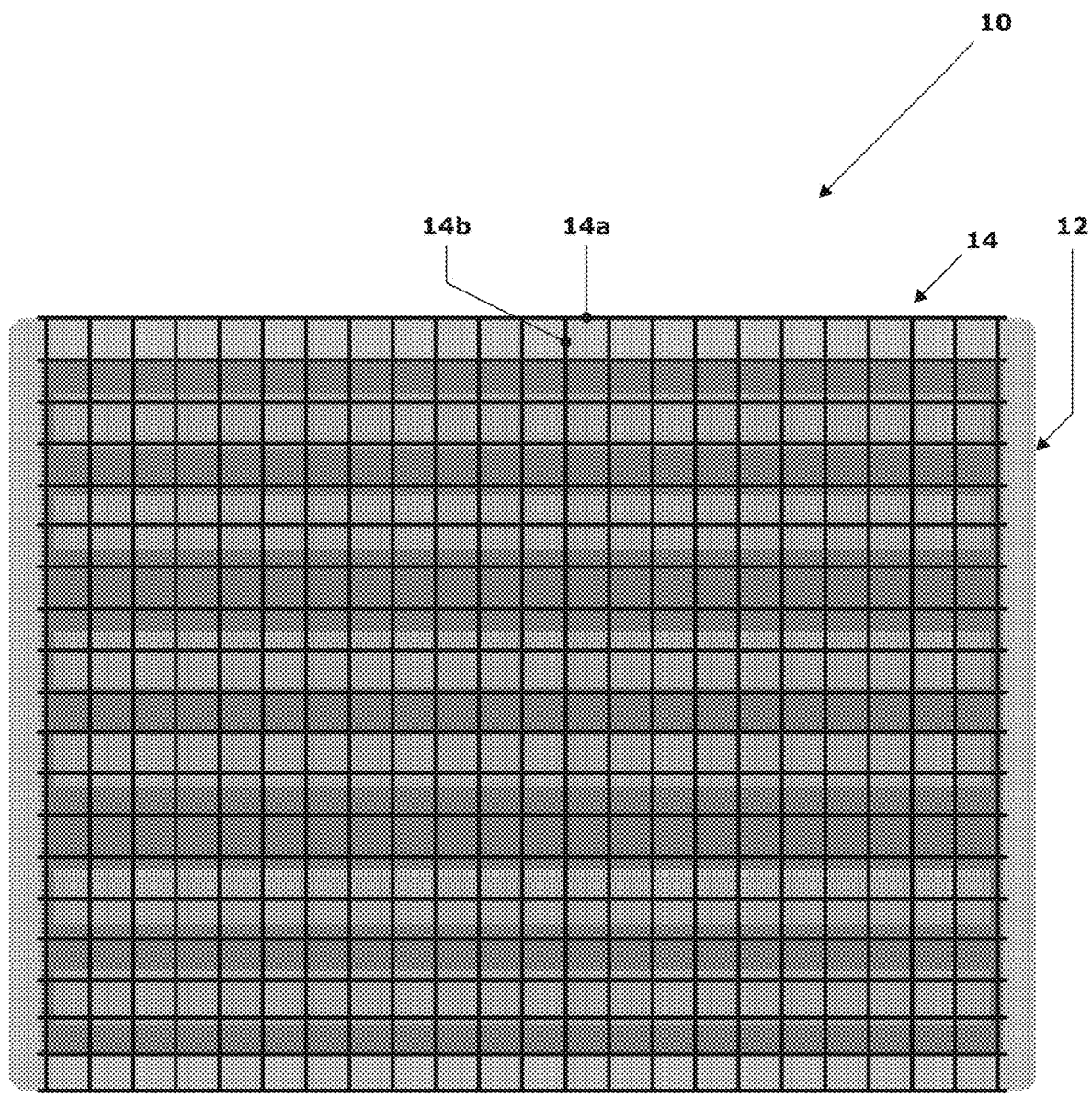
FIG. 2 is a bottom view of the apparatus.
Figure 3:
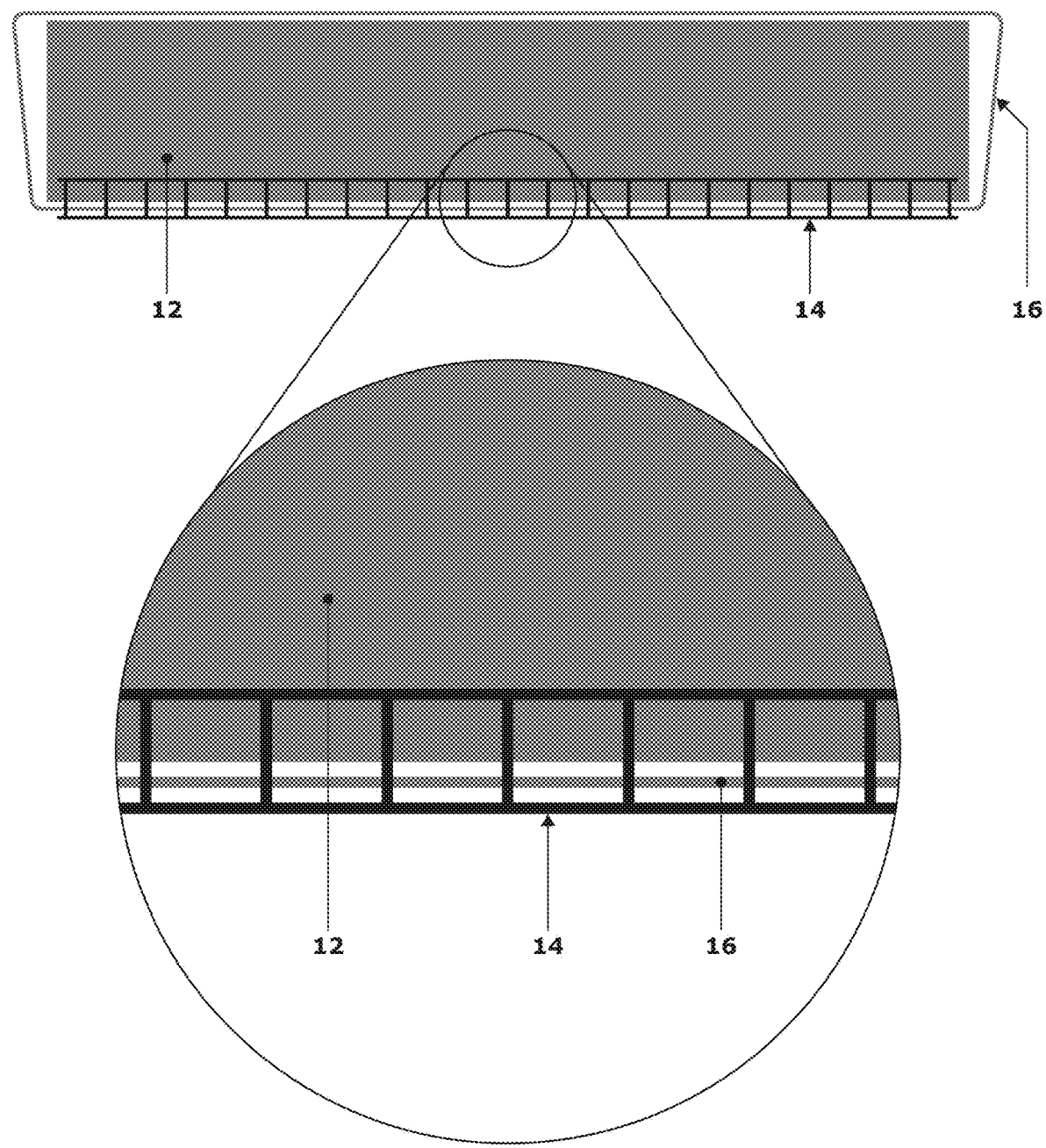
FIG. 3 is a side view of the apparatus, including an enlarged portion thereof.

Optionally, and with reference to FIGS. 1-3, the holder 10 and, in particular, the electromagnet 12 may be at least partially covered with a shield 16, such as along the portion opposing the component(s) C when selectively coupled thereto. The shield 16 may be applied as a coating and/or a sheet/film of a polymeric material such as, for instance, polyurethane, polytetrafluoroethylene, nylon, or the like. The selection of the shield material is dependent upon the characteristics of the flowable coating/slurry and/or mixture of materials used in the coating process.

In the embodiment described, the shield 16 material is a polyurethane sheet which can vary in thickness from several thousandths of an inch up to about one quarter of an inch. The selected shield thickness is dependent upon the strength of the electromagnet 12. A stronger electromagnet 12 can be covered with a thicker shield 16 and conversely a weaker electromagnet can have a thinner shield material.

Turning now to FIGS. 4-9, the use of the holder 10 in connection with the coating of a component C with a flowable material T, such as a slurry O in a container or bed D, or in a powder bed P, is illustrated. FIG. 4 presumes the electromagnet 12 is activated and lowered toward the component C resting in the bed D (note arrow L). The electromagnet 12 once activated draws or pulls the component C against the small area of contact created with one or more screen members (only one member 14a shown in FIG. 4 for purposes of illustration, but as noted multiple areas of contact, as seen in FIG. 1, would typically be created during the normal and anticipated usage). When this occurs, the adjacent coating T separates at the point of contact with the member 14a and thus forms a coating protrusion or bump B, as shown in FIG. 5. The small dimensions (diameter) of the member 14a combined with its rounded face move only a small portion of the coating bump B away from the component C, thus exposing only a small uncoated area of contact.

When the electromagnet 12 is deactivated, the component C is released and the screen member 14a is thus now removed from being in contact with the component (which is indicated by action arrow R). As indicated in FIG. 6, the coating bump B may flow back to cover the small area of contact that was exposed when component C was in contact with screen member 14a. The coating T is thus continuous, leaving no uncoated areas on component C, which may be then processed further (including possibly via additional coating steps, heat treatments, etc.).

FIGS. 7, 8, and 9 show a further aspect of the disclosure that may be used to address any remaining void V created by contact with the screen member 14a during the coating process. The arrangement in FIG. 8 shows that the void V remains as a result of the material pushed away by contact with the screen member 14a, thus creating a bump B or projection, as described in the foregoing passage. This scenario presumes that the material or the contact is such that reflow of the coating does not fill the void V.

When released from the electromagnet (not shown), and after the coating T has flowed back to decrease the size of void V (FIG. 8), the component C may fall (via gravity) into a second coating, such as for example a container including the coating, such as a dry powder bed P of a second coating material. This results in a second or outer coating O on the component C and over void V. The outer coating O may be similar in composition to, or different from, coating T.

Summarizing the foregoing, an improved apparatus and method for coating components with minimal damage is disclosed. A holder 10 used to hold the component once it is at least partially coated may comprise an electromagnet 12 including a spacer, such as at least two members 14a, 14b, and preferably a plurality of such members forming an open mesh or screen 14. The screen members 14a, 14b minimize contact with the component, and thus help to minimize damage to a coated component. To the extent any void V remains, a secondary coating may be applied. As a result, an improved coated component is provided in a manner that is relatively easy and inexpensive to implement in practice.

The foregoing description of certain embodiments provides an illustration of the principles of the invention and its practical application to thereby enable one of ordinary skill in the art to utilize the invention in various embodiments and with various modifications as are suited to the particular use contemplated. As indicated herein, the holder 10 may be used in connection with a single component, or else may simultaneously act on a plurality of components at once (see, e.g., FIG. 1) in order to maximize process efficiency. All such modifications and variations are within the scope of the invention as determined by the appended claims when interpreted in accordance with the breadth to which they are fairly, legally and equitably entitled.

The invention claimed is:

1. An apparatus for transporting a component at least partially coated with a flowable coating, comprising:
   a holder adapted for selectively forming a releasable coupling with the component, the holder including a screen adapted to minimize contact with a portion of the component including the flowable coating during the transport.

2. The apparatus of claim 1, wherein the holder comprises an electromagnet for selectively forming a magnetic coupling with the component.

3. The apparatus of claim 1, wherein the screen comprises an open mesh formed of one or more non-flat members.

4. The apparatus of claim 1, wherein the screen includes at least one opening having a dimension that is less than a corresponding dimension of the component being coated when releasably coupled to the holder.

5. The apparatus of claim 4, wherein the at least one opening is square or rectangular.

6. The apparatus of claim 1, further including a shield between a portion of the holder and the screen of the holder for shielding the holder from the at least partially coated component during the transport.

7. The apparatus of claim 6, wherein the shield comprises a sheet of material covering the portion of the holder corresponding to the screen.

8. The apparatus of claim 1, wherein the screen comprises a hydrophobic material.

9. The apparatus of claim 1, further including a lifter for raising and lowering the holder.

10. An apparatus for transporting a component at least partially coated with a flowable coating, the apparatus comprising:
    a holder comprising means for selectively forming a magnetic coupling with the component including a screen adapted to minimize contact with a portion of the component including the flowable coating during the transport.

11. The apparatus of claim 10, wherein the means for selectively forming the magnetic coupling comprises an electromagnet.

* * * * *